(12) United States Patent
Shepherd et al.

(10) Patent No.: US 7,156,354 B2
(45) Date of Patent: Jan. 2, 2007

(54) APPARATUS AND METHOD FOR LIFTING AERIAL CABLES

(75) Inventors: Keiron Shepherd, Rochedale South (AU); Trevor John Clem, Gailes (AU)

(73) Assignee: Mscle Holdings Pty. Ltd., Woodridge (AU)

( * ) Notice: Subject to any disclaimer, the term of this patent is extended or adjusted under 35 U.S.C. 154(b) by 27 days.

(21) Appl. No.: 10/504,858

(22) PCT Filed: Mar. 3, 2003

(86) PCT No.: PCT/AU03/00256

§ 371 (c)(1),
(2), (4) Date: Aug. 27, 2004

(87) PCT Pub. No.: WO03/074415

PCT Pub. Date: Sep. 12, 2003

(65) Prior Publication Data

US 2005/0156092 A1 Jul. 21, 2005

(30) Foreign Application Priority Data

Mar. 1, 2002 (AU) .................................. PS0842

(51) Int. Cl.
*F16M 11/00* (2006.01)
(52) U.S. Cl. .................................. 248/407; 248/125.8
(58) Field of Classification Search ............... 248/404, 248/407, 332, 125.2, 125.8; 254/134.3 PA, 254/11, 12; 403/109.1
See application file for complete search history.

(56) References Cited

U.S. PATENT DOCUMENTS

| 1,384,761 | A | | 7/1921 | Jessup |
| 1,581,325 | A | * | 4/1926 | Sands .................. 403/300 |
| 1,725,329 | A | * | 8/1929 | Blandford ............... 414/11 |
| 1,748,597 | A | * | 2/1930 | Collins .................. 211/172 |
| 2,391,536 | A | * | 12/1945 | Anderson et al. ......... 52/111 |
| 3,788,691 | A | | 1/1974 | McMullin |
| 4,079,978 | A | | 3/1978 | McMullin |
| 5,114,109 | A | | 5/1992 | Fitz et al. |

FOREIGN PATENT DOCUMENTS

| DE | 2620458 | 11/1977 |
| DE | 2854034 | 7/1980 |
| EP | 0443843 | 4/1994 |
| GB | 2294029 | 4/1996 |

* cited by examiner

*Primary Examiner*—Ramon O Ramirez
(74) *Attorney, Agent, or Firm*—Hoffman, Wasson & Gitler, PC

(57) ABSTRACT

A portable telescopic lifting apparatus (1) for lifting aerial cables (53). The apparatus (1) comprises a tubular housing (2), first and second telescopic members (3, 4) extendible from and retractable into the housing (2), a drive (5, 60) for extending and retracting the telescopic members (3, 4), and a cable-engaging member (51) attached to the second telescopic member (4) for lifting one or more aerial cables (53). The drive (5, 60) comprises a chain lever block (5) and a pulley arrangement (60). In use, the apparatus (1) is positioned below one or more aerial cables (53), the chain lever block (5) is used to raise the first telescopic member (3), the first telescopic member (3) extends from within the housing (2), the second telescopic member (4) extends from within the first telescopic member (3), and cable-engaging member (51) raises the cable/s (53).

18 Claims, 3 Drawing Sheets

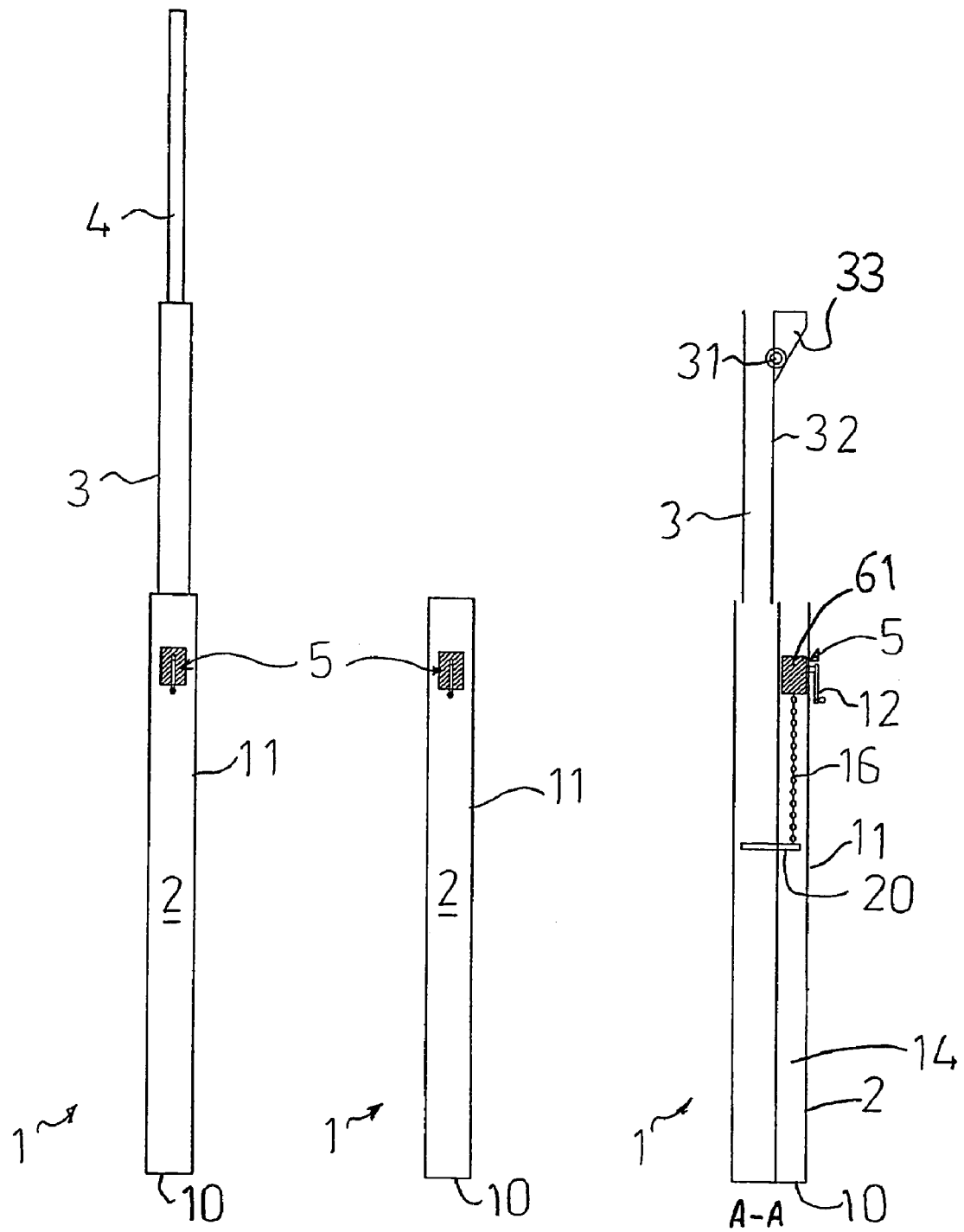

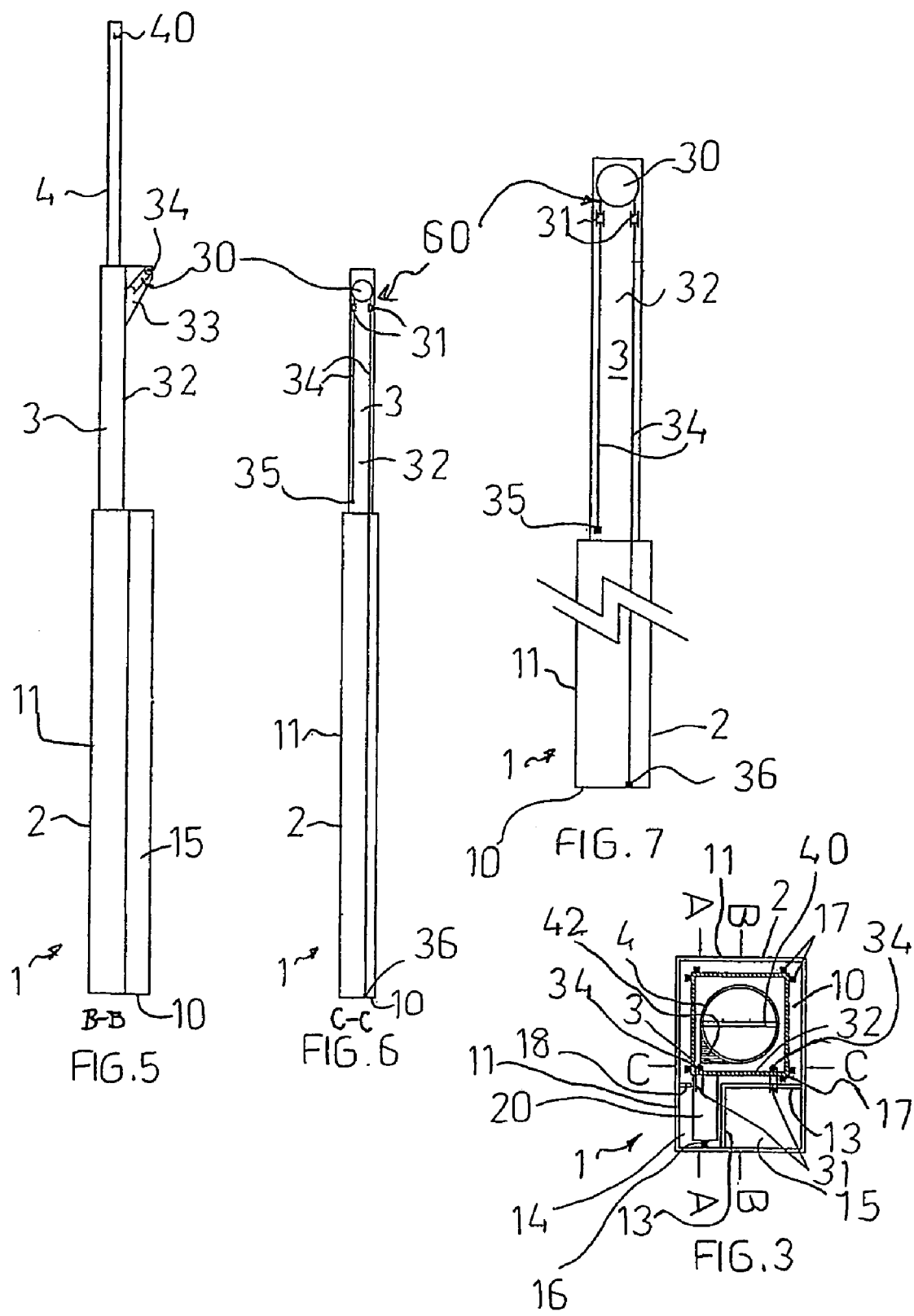

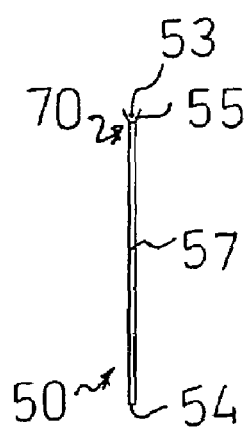
FIG. 8
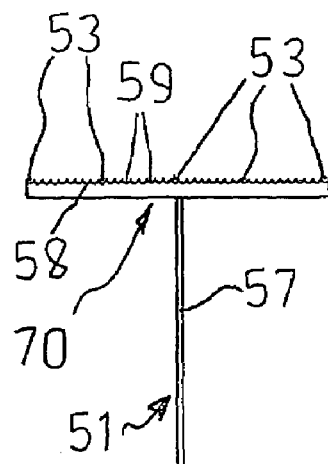
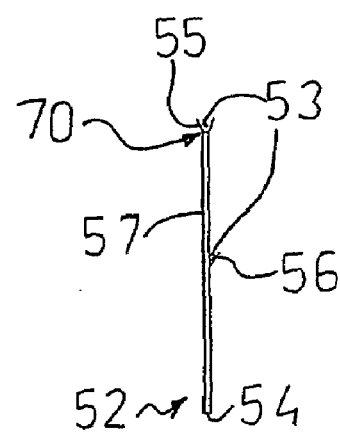
FIG. 9
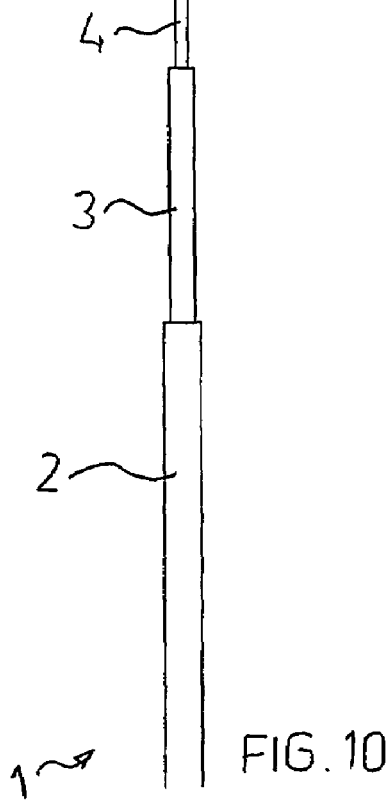
FIG. 10

APPARATUS AND METHOD FOR LIFTING AERIAL CABLES

TECHNICAL FIELD

This invention relates to an apparatus and method for lifting aerial cables such as overhead electrified cables. In particular, the invention concerns a portable telescopic apparatus for lifting one or more aerial cables.

BACKGROUND ART

A common problem encountered by trucks carrying oversized loads is that their journey along a road may be obstructed by an overhead electrified cable or other type of aerial cable. The standard practices for overcoming this problem are to lift the cable using hydraulic lifting equipment (ie. a "cherry picker") or to manually lift and hold the cable with hand-held "lift sticks". Two or more cherry pickers and operators may be needed to lift and hold a cable in the lifted position until the oversized load has passed beneath the cable. In situations where there are multiple aerial cables, the number of operators and cherry pickers needed to lift the cables will typically increase.

Some of the disadvantages of the above practices are: that they may involve an operator physically lifting and holding a cable for an extended period of time and the cable may weigh as much as 30 kg; since a cherry picker is typically operated from within a bucket of the cherry picker, the operator may be in dangerously close proximity of an electrified cable; and, the practices may be costly and time consuming, particularly when many operators and cherry pickers are required.

It is therefore an object of the present invention to provide a portable apparatus and method for lifting aerial cables that minimises or overcomes at least one of the disadvantages referred to above, or to provide the public with a useful or commercial choice.

DISCLOSURE OF INVENTION

According to a first aspect of the present invention, there is provided a portable apparatus for lifting at least one aerial cable, said apparatus comprising:
   an elongate housing;
   at least a first telescopic member extendible from and retractable into the elongate housing;
   a drive operable at the elongate housing for extending and retracting the first telescopic member; and
   at least one cable-engaging member positionable by the first telescopic member for lifting said at least one aerial cable when the first telescopic member has extended.

Any suitable type of drive can be used. The drive can include, for instance, an electric motor, a hydraulic motor, an engine, a chain lever block, a hand winch, a hoist arrangement, a jacking arrangement or any suitable combination of the aforementioned.

Preferably, the drive comprises a chain lever block. The chain lever block can be mounted to the elongate housing and the chain of the chain lever block can be attached to a lower end of the first telescopic member. The block of the chain lever block can be located within the elongate housing and the operative lever of the chain lever block can extend from within the elongate housing. The elongate housing can have separate compartments for containing parts of the chain extending from opposite sides of the block, so as to prevent entanglement of the chain.

The elongate housing can be of any suitable size, shape and construction. Preferably, the elongate housing is a tube of rectangular cross-section. The elongate housing can have internal walls/guides to ensure that the first telescopic member extends and retracts correctly.

Whilst supporting the aerial cable, the apparatus is free standing and can pivot relative to the ground to follow movement of the cable. Preferably, a ground-bearing base of the elongate housing is adapted for pivoting. The base can be of any suitable shape, size and construction. Preferably, the base is wedge-shaped and the apparatus can pivot relative to the ground about an edge of the wedge.

The apparatus can comprise any suitable number of telescopic members. In a preferred form of the invention, the apparatus includes a second telescopic member extendible from and retractable into the first telescopic member, and the cable-engaging member is attached to the second telescopic member.

The first and second telescopic members can be of any suitable size, shape and construction. Preferably, the first telescopic member comprises a tube of rectangular cross-section and the second telescopic member comprises a tube of circular cross-section.

Preferably, the drive further comprises a pulley arrangement for extending and retracting the second telescopic member. The pulley arrangement can have at least one sheave attached to an upper end of the first telescopic member and a flexible tie of the pulley arrangement can extend around the sheave and have respective ends attached to a lower end of the second telescopic member and to a lower end of the elongate housing. With this arrangement, when the first telescopic member is raised with the chain lever block, the second telescopic member extends about twice as far as the first telescopic member. The flexible tie can be, for instance, a wire cable or a cord.

The apparatus can have a locking mechanism for ensuring that the first and second telescopic members cannot extend or retract unless the chain lever block is first operated. Any suitable type of locking mechanism can be used.

The cable-engaging member can be of any suitable size, shape and construction. Depending on how many telescopic members the apparatus has, the cable-engaging member can be attached to the second telescopic member or to first telescopic member. The cable-engaging member can be attached in any suitable way. The apparatus can have any suitable number of cable-engaging members.

The cable-engaging member preferably has a body and a headpiece extending from the body. A lower end of the body can be removably attached to an upper end of the second telescopic member. Preferably, the body is attached such that the cable-engaging member and telescopic member cannot rotate relative to one another. This may be achieved by providing the second telescopic member and body with, for instance, a pin and slot arrangement, a tongue and groove arrangement, or a bayonet arrangement.

The cable-engaging member can have a fork, tines, a groove, a channel, a recess or any other suitable formation by which a cable can be engaged and lifted. The apparatus can be used to lift a plurality of cables at any one time in which case the cable-engaging member can have a plurality of forks, grooves etc. The forks, grooves etc. can be located at the headpiece and/or the body.

In one embodiment of the invention, the headpiece has an undulating surface, much like the working end of a rake, wherein individual cables are receivable within separate grooves of the undulating surface. With this arrangement, the cables can be kept in isolation from one another when being lifted. In another embodiment of the invention, the headpiece and/or body has at least one fork or recess for engaging and lifting at least one cable.

Preferably, the apparatus is compact and lightweight. The apparatus can consist of any suitable material or materials such as, for example, metal, plastics material, and composites. When used for lifting electrified cables, the apparatus, or parts thereof, can be insulated. For instance, the cable-engaging member can be insulated.

According to a second aspect of the invention there is provided a method for raising at least one aerial cable, said method comprising the steps of:
 a) positioning a lifting apparatus beneath an aerial cable, said apparatus comprising:
 a housing;
 at least a first telescopic member extendible from and retractable into the housing;
 a drive operable at the housing for extending and retracting the first telescopic member; and
 at least one cable-engaging member positionable by the first telescopic member for lifting said at least one aerial cable when the first telescopic member has extended; and
 b) lifting the aerial cable.

The housing can be of any suitable size, shape and construction. The housing can be in the form of a stand. Whilst supporting the aerial cable, the apparatus is free standing and can pivot relative to the ground to follow movement of the cable. Preferably, the housing is tubular.

Preferably, the apparatus includes a second telescopic member extendible from and retractable into the first telescopic member, and the cable-engaging member is attached to the second telescopic member.

Preferably, the cable-engaging member can lift multiple aerial cables in isolation from one another at the same time.

The apparatus can have other features as described in respect of the first aspect of the invention.

The term "comprise", or variations of the term such as "comprises" or "comprising", are used herein to denote the inclusion of a stated integer or stated integers but not to exclude any other integer or any other integers, unless in the context or usage an exclusive interpretation of the term is required.

Best modes for carrying out the invention will now be described with reference to the accompanying drawings.

BRIEF DESCRIPTION OF DRAWINGS

FIG. 1 is a front elevation view of part of a portable aerial cable lifting apparatus when fully extended, according to an embodiment of the invention;

FIG. 2 shows the apparatus of FIG. 1 when fully retracted;

FIG. 3 is a top plan view of part of the apparatus shown in FIG. 1;

FIG. 4 is a side sectional view taken along plane A—A of the apparatus shown in FIG. 3;

FIG. 5 is a side sectional view taken along plane B—B of the apparatus shown in FIG. 3;

FIG. 6 is a front sectional view taken along plane C—C of the apparatus shown in FIG. 3;

FIG. 7 is a partly detailed front elevation view of part of the apparatus shown in FIG. 1;

FIG. 8 is a front elevation view of a cable-engaging member for the apparatus shown in FIG. 1, according to an embodiment of the invention;

FIG. 9 is a front elevation view of a cable-engaging member for the apparatus shown in FIG. 1, according to an embodiment of the invention; and FIG. 10 is a front elevation view of part of the apparatus shown in FIG. 1 but having a cable-engaging member, according to an embodiment of the invention.

BEST MODES FOR CARRYING OUT THE INVENTION

In all of the drawings, like reference numerals refer to like parts.

Referring first to FIG. 10, there is shown a portable aerial cable lifting apparatus 1 comprising an elongate housing 2, a first telescopic member 3, a second telescopic member 4, a drive (not shown) operable at the housing 2, and a cable-engaging member 51 for lifting one or more aerial cables 53. The drive comprises a chain lever block 5 and a pulley arrangement 60.

Referring now to FIGS. 1 to 7, a first telescopic member 3 is extendable from and retractable into the housing 2, and a second telescopic member 4 is extendable from and retractable into the first telescopic member 3.

As seen in FIG. 4, the chain lever block 5 has a block 61, a chain 16 extending over the block 61, and a lever 12 for operating the block 61.

The housing 2 is tubular, it has a ground-bearing base 10 and four sidewalls 11 (only some of which have been labelled) extending therefrom. The base 10 is wedge-shaped and the apparatus 1 can pivot relative to the ground about an edge of the wedge. Internal sidewalls 13, 18 and elongate nylon guides 17 (only some of which have been labelled) ensure that the first telescopic member 3 extends and retracts correctly within the housing 2 (see FIG. 3). Sidewalls 13 and 18 extend from the base 10 to a position below the block 61. The sidewalls 11, 13, 18 together provide two compartments 14, 15. The compartments 14, 15 collect and contain parts of the chain 16 hanging from opposite sides of the block 61, so as to prevent entanglement of the chain 16. A lifting flange 20 extends from a lower end of the first telescopic member 3 between sidewalls 13 and 18, and the chain 16 is attached to the flange 20. The block 5 is mounted to a sidewall 11 of the housing 2 for rotation relative thereto. Lever 12 extends from the sidewall 11.

The first telescopic member 3 comprises a tube of rectangular cross-section and the second telescopic member 4 comprises a tube of circular cross-section. The housing 2 and telescopic members 3, 4 consist of aluminum or composite materials (eg. Kevlar®) that will not buckle when placed under load. A pin 40 extends diametrically across an upper region of the second telescopic member 4, as seen in FIGS. 3 and 5. A lifting flange 42 extends from a lower region of the second telescopic member 4, as seen in FIG. 3. Flange 42 prevents the second telescopic member 4 from rotating within the first telescopic member 3.

Referring now to FIGS. 3 to 7, the pulley arrangement 60 includes a main sheave 30, two additional smaller sheaves 31 and a wire cable 34. As seen in FIGS. 4 and 5, an angle bracket 33 mounts sheaves 30 and 31 to a front sidewall 32 of the first telescopic member 3. The front sidewall 32 has a pair of slits (not shown) through which extend sheaves 31. The cable 34 extends partly around each of the sheaves 30, 31 and through the slits. As seen in FIGS. 6 and 7, one end 35 of the cable 34 is attached to flange 42 and the other end 36 of the cable 34 is attached to the base 10 of the housing 2, so that when the first telescopic member 3 extends the second telescopic member 4 extends as well.

FIGS. 8 to 10 show different types of cable-engaging members 50, 51, 52 for lifting aerial cables 53. Each member 50, 51, 52 basically comprises a cylindrical body 57 and a headpiece 70 for engaging one or more cables 53. A lower end of the body 57 fits within the second telescopic member 4 and has a slot 54 that receives pin 40. The pin 40 prevents member 50 from rotating.

The headpiece 70 of member 50 comprises a fork 55 for lifting a single cable 53. Member 52 differs from member 50 in that it has a second fork 56 of sorts (for a second cable 53) extending from the body 57. Member 51 differs from members 50 and 52 in that its headpiece 70 has an undulating surface 58. Each groove 59 of the undulating surface 58 can receive a cable 53. Undulating surface 58 enables multiple cables 53 to be lifted at any one time and to be kept in isolation from one another.

In use, the apparatus 1, with the telescopic members 3, 4 fully retracted, is positioned beneath one or more aerial cables (eg. overhead power lines) that need to be raised, so that, for instance, a truck carrying an oversized load may pass therebeneath. A suitable cable-engaging member 50, 51, 52 is attached to the second telescopic member 4. The chain lever block 5 is operated, the first telescopic member 3 extends from within the housing 2 and the second telescopic member 4 extends from the first telescopic member 3. If multiple cables need to be lifted, then either member 51 or 52 is used. If a single cable needs to be lifted, then any one of members 50 to 52 can be used. The telescopic members 3, 4 are extended until there is sufficient clearance between a top of the oversized load and the cable/s. The chain lever block 5 is locked such that the telescopic members 3, 4 cannot retract by accident. If lifting electrified cables, then the apparatus 1 is insulated. For instance, the cable-engaging member 50, 51, 52 and/or the second telescopic member 4 can consist of a non-conductive material or can be insulated with rubber. After the truck has passed beneath the cable/s, the telescopic members 3, 4 are retracted and the member 50, 51, 52 may be detached.

Once an aerial cable has been lifted, the apparatus 1 is free standing and the apparatus 1 can, if necessary, pivot relative to the ground. The pivoting action enables the apparatus 1 to follow the movement of the lifted cable (such as when the cable sways when blown by wind) and reduces the bending moment on the apparatus 1.

The advantages of the invention include that: the apparatus can be used to raise one or more cables at any one time; since the apparatus is free standing whilst supporting the cable/s, other cables can be lifted by a single operator using additional like apparatuses; the apparatus can be used on uneven or sloping ground as it has a small ground-bearing surface; in the retracted state, the apparatus can be easily handled, transported and stored; an operator need not rely on physical strength to lift and hold a cable in the lifted position; since the apparatus is operable at ground level, an operator need not be in close proximity of an electrified cable; specialised machinery such as cherry pickers are not required; and, the apparatus can be positioned and extended in a time efficient manner with a great degree of accuracy and control.

Whilst the above has been given by way of illustrative example of the invention, many modifications and variations may be made thereto by persons skilled in the art without departing from the broad scope and ambit of the invention as herein set forth.

The invention claimed is:

1. A portable apparatus for lifting at least one aerial cable, said apparatus comprising:
    an elongate housing;
    at least a first telescopic member extendible from and retractable into the elongate housing;
    a drive operable at the elongate housing for extending and retracting the first telescopic member; and
    at least one cable-engaging member positionable by the first telescopic member for lifting said at least one aerial cable when the first telescopic member has extended,
wherein said housing is adapted to pivot relative to the ground to follow movement of the aerial cable should the aerial cable sway after having been lifted.

2. The apparatus of claim 1, wherein the drive comprises a chain lever block mounted to the elongate housing and a chain of the chain lever block is attached to a lower end of the first telescopic member.

3. The apparatus of claim 2, wherein a block of the chain lever block is located within the elongate housing, an operative lever of the chain lever block extends from within the elongate housing and the elongate housing has separate compartments for containing parts of the chain extending from opposite sides of the block.

4. The apparatus of claim 3, wherein the elongate housing has internal guides for the first telescopic member.

5. The apparatus of claim 2, wherein the apparatus further comprises a second telescopic member extendible from and retractable into the first telescopic member, and the cable-engaging member is attached to the second telescopic member.

6. The apparatus of claim 5, wherein the drive further comprises a pulley arrangement for extending and retracting the second telescopic member.

7. The apparatus of claim 6, wherein the pulley arrangement has at least one sheave attached to an upper end of the first telescopic member and a flexible tie of the pulley arrangement extends around the sheave and has respective ends attached to a lower end of the second telescopic member and to a lower end of the elongate housing.

8. The apparatus of claim 7, wherein when the first telescopic member is raised with the chain lever block, the second telescopic member extends about twice as far as the first telescopic member.

9. The apparatus of claim 5, wherein the cable-engaging member has a body removably attached to an upper end of the second telescopic member and a headpiece extending from the body.

10. The apparatus of claim 9, wherein the headpiece and/or body has at least one fork or recess by which at least one said cable can be engaged and lifted.

11. The apparatus of claim 10, wherein the headpiece has an undulating surface and individual said cables are receivable within separate grooves of the undulating surface.

12. The apparatus of claim 1, wherein a ground-bearing base of the elongate housing is wedge-shaped and the housing pivots relative to the ground about an edge of the wedge.

13. A method for raising at least one aerial cable, said method comprising the steps of:
    a) positioning a lifting apparatus beneath an aerial cable, said apparatus comprising:
        a housing;
        at least a first telescopic member extendible from and retractable into the housing;

a drive operable at the housing for extending and retracting the first telescopic member;

at least one cable-engaging member positionable by the first telescopic member for lifting said at least one aerial cable when the first telescopic member has extended; and b) lifting the aerial cable, wherein said housing is adapted to pivot relative to the ground to follow movement of the aerial cable should the aerial cable sway after having been lifted.

14. The method of claim 13, wherein the apparatus is free standing only whilst supporting the aerial cable.

15. The method of claim 13 wherein the apparatus further comprises a second telescopic member extendible from and retractable into the first telescopic member, and the cable-engaging member is attached to the second telescopic member.

16. The method of claim 13, wherein the cable-engaging member lifts multiple aerial cables in isolation from one another at the same time.

17. The method of claim 13, wherein the housing is tubular.

18. The method of claim 13, wherein a ground-bearing base of the housing is wedge-shaped and the housing pivots relative to the ground about an edge of the wedge.

* * * * *